March 12, 1957 C. E. NEWKIRK 2,784,657
TRACTOR DRAWN AGRICULTURAL IMPLEMENT
Filed Dec. 14, 1953 2 Sheets-Sheet 1
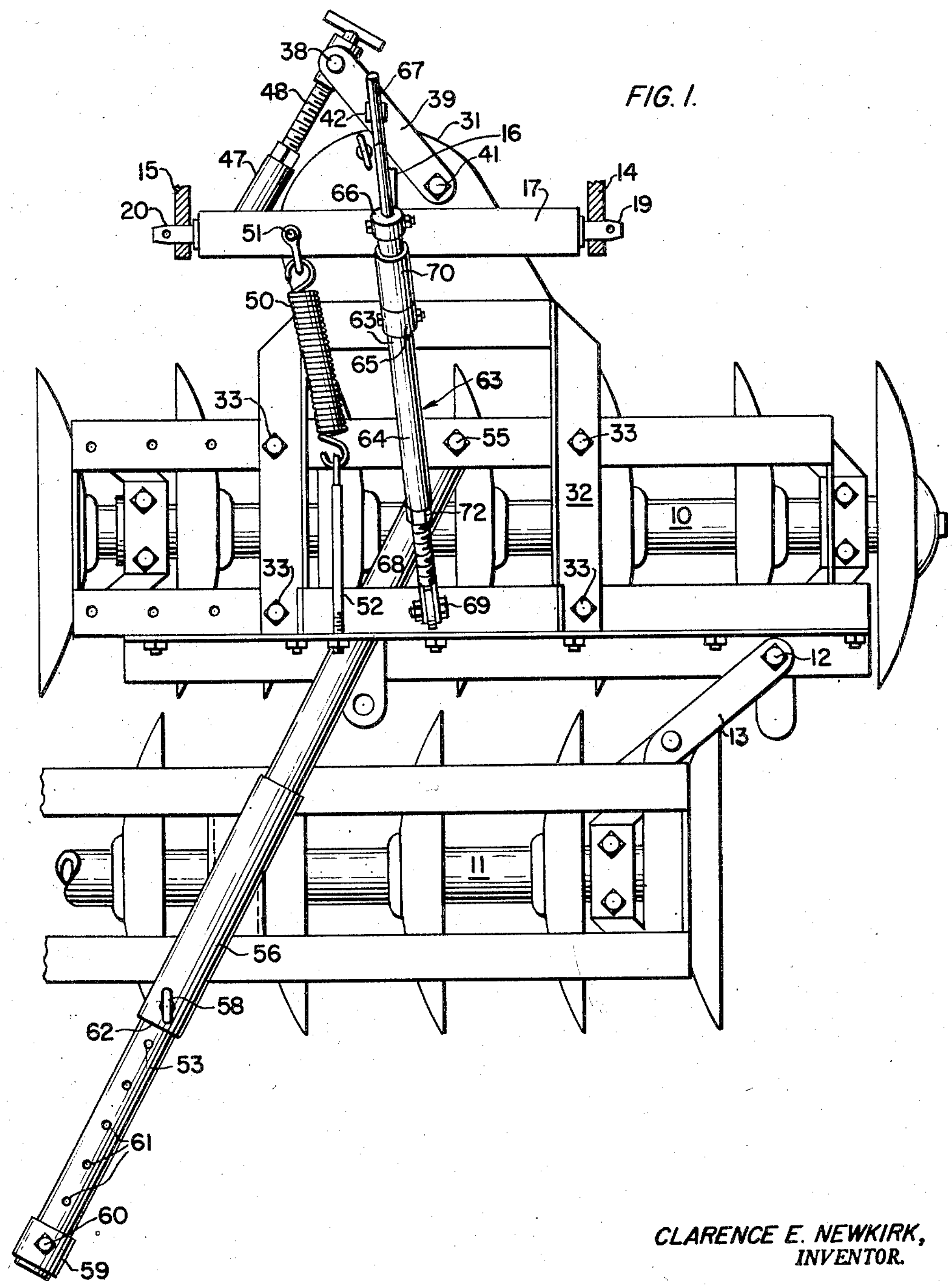
CLARENCE E. NEWKIRK, INVENTOR.
BY George Douglas Jones
ATTORNEY.

TRACTOR DRAWN AGRICULTURAL IMPLEMENT
Filed Dec. 14, 1953 2 Sheets-Sheet 2
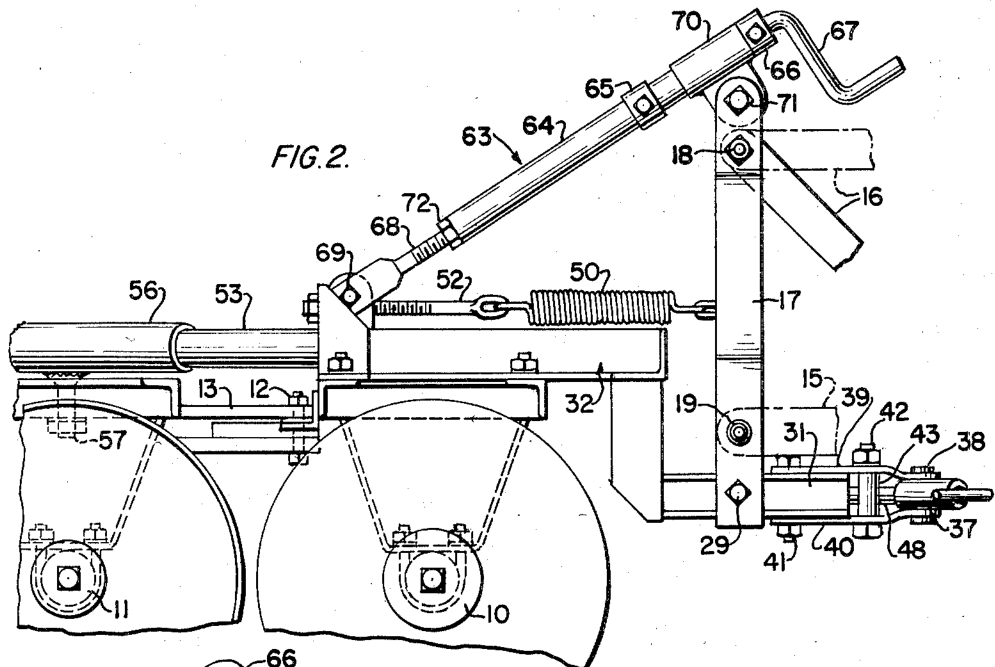
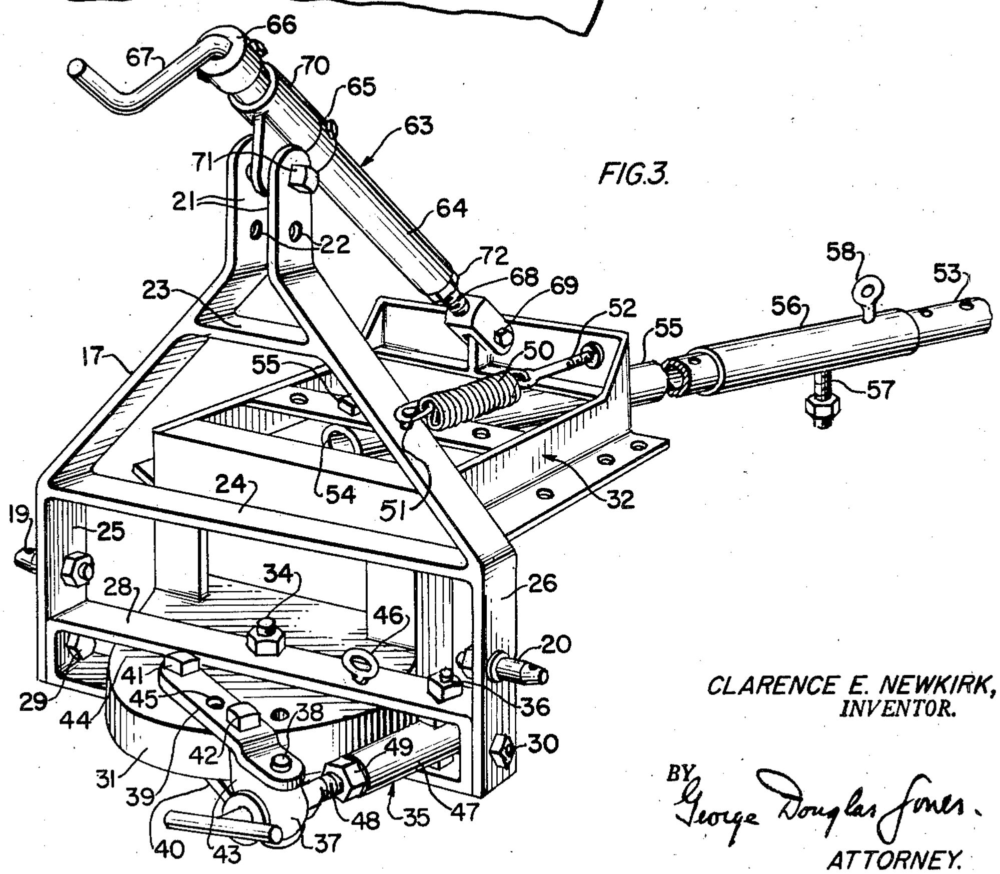
CLARENCE E. NEWKIRK,
INVENTOR.
BY George Douglas Jones.
ATTORNEY.

United States Patent Office 2,784,657

Patented Mar. 12, 1957

2,784,657

TRACTOR DRAWN AGRICULTURAL IMPLEMENT

Clarence E. Newkirk, Anaheim, Calif.

Application December 14, 1953, Serial No. 397,867

1 Claim. (Cl. 97—47.53)

This invention relates to an agricultural implement for tractors and more particularly to an improvement on the implement as disclosed in my co-pending patent application for Agricultural Implements for Tractors, Serial No. 351,207, filed April 27, 1953.

Heretofore, certain problems have existed relative to the operation and transportation of multiple gang offset discs when employed in connection with conventional elevating tractor hitches.

Various movements and adjustments necessary to operate such an implement, when drawn by an elevating hitch, posed many difficulties. It is desirable to provide pivotal action of the implement on a horizontal axis and also on a vertical axis relative to the hitch frame to which the conventional elevating hitch arms are connected. Provision of certain novel arrangements for implement elevating control and lateral control are necessary when in operation and also when being transported. Such functions have heretofore presented somewhat difficult conditions to attain and maintain in a simple, durable mechanism.

Furthermore, suitable control of side draft of the leading disc gang relative to the tractor and also angularity of the rear disc gang relative to the front disc gang has further complicated the problem of attaining a certain durable mechanism to combine all these functions.

It is an object of the present invention to provide an agricultural implement for tractors wherein a simple, efficient and durable mechanism provides for complete control of a multiple gang offset disc, during soil working operations and during elevated transportation thereof, by means of conventional tractor elevating hitches.

Another object of the invention is to provide a novel arrangement of the hitch frame wherein a hitch pivot bar provides for pivotal movement of the hitch frame on both horizontal and vertical axes relative to the implement being drawn thereby.

Another object of the invention is to provide an arrangement of a hitch frame and pivot bar together with an elevation control device for attaining harmonious pivotal action of the implement relative to the hitch frame on a horizontal axis while the implement may be operated in offset relationship to the tractor by pivotal adjustment of the hitch pivot bar about a vertical axis relative to the implement.

Another object of the invention is to provide a hitch frame which is adjustable on a vertical axis relative to the implement and also pivotally movable on a horizontal axis relative to the implement below the conventional elevating hitch arm axes whereby a moment is created forwardly against the conventional elevating hitch top link when the implement is drawn by the tractor.

Another object of the invention is to provide a combined hitch pivot bar and control frame having an elevation control jack which permits floating action of the implement relative to the hitch frame when moving over uneven ground and which also provides support for the implement when elevated above the ground during transportation thereof.

A further object of the invention is to provide a hitch frame pivotally mounted on a hitch pivot bar whereby vertical and horizontal axial movement may be attained relative to the implement and whereby a fixed draft control jack may be readily and easily adjusted to shift the angular relationship of the hitch frame relative to the implement in order to preset the draft angle thereof relative to the tractor.

Many further objects of the invention may be recognized with reference to the specification, claim, and drawings forming a part of this application in which:

Fig. 1 is a fragmentary top or plan view of the agricultural implement for tractors according to the present invention.

Fig. 2 is a fragmentary side elevational view thereof, and,

Fig. 3 is a perspective view of the control frame and connected hitch and draft control mechanism showing portions thereof, fragmentarily.

Referring to Fig. 1 of the drawings, it will be seen that the invention is related to a front disc gang 10 to which a rear disc gang 11 is pivotally connected by means of a bolt 12 which extends through an arm 13 fixed to the rear disc gang 11.

Referring to both Figs. 1 and 2 of the drawings, it will be seen that the disc gangs 10 and 11 are drawn by conventional tractor implement elevating hitch members 14, 15 and 16. The elevating hitch members are so arranged in connection with the hitch frame 17 that they are capable of raising the entire implement above the surface of the ground. This is a conventional operative arrangement of such elevating hitch members. The uppermost hitch member 16 is pivotally connected with the hitch frame member 17 by means of a bolt 18, while the lower hitch members 14 and 15 are connected to the hitch frame 17 by means of trunnions 19 and 20, which are substantially aligned with each other on a horizontal axis.

As shown in Fig. 3 of the drawings, the hitch frame 17 is substantially A-shaped and is provided with bifurcated portions 21 at its upper end in which openings 22 are adapted to receive the bolt 18. The bifurcated portions 21 are sufficiently spaced to permit installation of the hitch member 16 therebetween.

The cross members 23 and 24 interconnect opposite side portions 25 and 26 of the hitch frame 17 to provide rigidity thereof. The side portions 25 and 26 near the lower portion of the hitch frame 17 are connected to opposite ends of the pivot bar 28 by means of bolts 29 and 30. These bolts 29 and 30 are disposed on a substantially horizontal axis and permit pivotal movement of the hitch frame 17 with respect to the pivot bar 28. The pivot bar 28 is bifurcated and extends above and below a horizontal projection 31 of the control frame 32 which is rigidly connected to the front disc gang by bolts 33. The pivot bar 28 is pivotally mounted on the control frame 31 by means of the bolt 34.

A draft control jack 35 is pivotally connected to the pivot bar 28 by means of the bolt 36 while the opposite end of the draft control jack 35 is supported by a nut 37 having trunnions 38 pivoted in straps 39 and 40, which are disposed at upper and lower sides of the control frame projection 31.

Extending through the straps 39 and 40 and also through the projection 31 is a bolt 41 which forms a pivotal support for the straps 39 and 40. Another bolt 42 extends through the straps 39 and 40 and also through a tubular spacer 43 which is disposed therebetween and positioned outwardly of the arcuate portion 44 of the control frame projection 31.

Openings 45 in the straps 39 and 40 coincide with openings in the projection 31 in order to receive a pin therethrough for fixing the disposition of the straps 39 and 40 relative to said projection 31. Thus a rigid support of the nut 37 of the draft control jack 35 may be attained for forcing pivotal adjustment of the hitch frame 17 about the axis of the bolt 34 in order to adjust draft of the implement being drawn by the tractor connected with the hitch frame 17.

A pin 46 is adapted to extend through the pivot bar 28 and the control frame projection 31 for fixing the angular relationship or the draft relationship of the hitch frame 17 relative to the implement being drawn by the tractor. This pin 46 must be removed during draft adjustment of the hitch when employing the draft control jack 35.

The draft control jack 35 is provided with an internally screw-threaded tubular member 47 in which the screw 48 is screw-threadably engaged. The screw 48 is rotatable in the nut 37 and is restrained against longitudinal movement therein by conventional shoulders whereby rotative movement of the screw 48 in the nut 37 causes the same to be screw-threaded into or extended from the tubular member 47. A lock nut 49 is provided for jamming the screw 48 relative to the tube 47 whereby a certain draft angle may be fixed.

A spring 50 is connected to the hitch frame 17 by means of a pin 51 while the opposite end of the spring 50 is adjustably connected to the control frame 32 by means of the bolt 52. It will be noted that the spring 50 with its axis disposed laterally of the bolt 34 is adapted to prevent the implement from swinging about the vertical axis of the pivot bar 28 when the implement is elevated and being transported. Tension of the spring 50 may be adjusted by the bolt 52 to provide sufficient stabilization.

A rear gang draw bar 53 at its forward end 54 is pivotally connected to the control frame 32 by means of a bolt 55. This draw bar 53 extends through a sleeve 56 which is pivotally connected to the rear disc gang frame by means of an extending bolt 57 fixed to the lower side of the sleeve 56. A pin 58 is provided to extend through the sleeve 56 and the draw bar 53 for fixing the angular relationship of the rear disc gang relative to the axis of the front disc gang.

Fixed on the draw bar 53, near its extending end, is a limit sleeve 59 retained by a bolt 60 which may be positioned in any one of the holes 61 in the draw bar 53 to provide a stop limit for disposition of the rear end 62 of the sleeve 56, all this shown best in Fig. 1 of the drawings.

Interconnecting the control frame 32 and the hitch frame 17 is an elevation control jack 63. This jack is provided with an internally screw-threaded tube 64 having spaced sleeves 65 and 66 and a crank 67 connected therewith. Internally screw-threaded in the tube 64 is a screw 68 which is pivotally mounted on the frame 32 by means of an axially horizontal bolt 69. A sleeve 70 surrounds the tube 64 between the sleeves 65 and 66 and is pivoted to the bifurcated portions 21 of the hitch frame 17 by means of a bolt 71, as shown best in Fig. 3 of the drawings. A lock nut 72 is screw-threaded on the bolt 68 and is arranged to be jammed against the end of the tube 64 for locking the elevation control jack in certain extended or retracted position.

The operation of the agricultural implement for tractors according to the present invention is substantially as follows:

When the hitch frame 17 is connected to the elevating hitch members 14, 15 and 16, as heretofore described, the multiple disc gang implement is drawn behind the tractor and may be permitted to pivot about the axis of the bolt 34 when the pin 46 and the draft control jack are not arranged in fixed relation with the projection 31 of the control frame 32.

The angular axial relation of the front and rear disc gangs may be adjusted in connection with the draw bar 53 and sleeve 56 as desired, whereby, pivotal support of the rear disc gang is provided by the bolt 12 extending the arm 13 and a portion of the frame in connection with the front disc gang.

While the implement is being drawn by the tractor, the control frame 32 may pivot relative to the hitch frame 17, as provided for by the bolts 29 and 30, which are substantially on a horizontal axis and which provide a pivotal connection of the hitch frame with the pivot bar 28 which is pivotally connected with the control frame 32 by means of the axially vertical bolt 34.

During pivotal movement of the control frame 32 relative to the hitch frame 17 on the horizontal axis of the bolts 29 and 30, the elevation control jack 63, at its tube portion 64, slides in the sleeve 70, within limits set by the sleeves 65 and 66. This provides for floating action of the elevation control jack to permit the implement to follow the tractor over uneven ground and to pass through ditches without causing undue stress in the hitch mechanism.

When it is desired to adjust the elevation control jack 63, the lock nut 72 may be loosened and the crank 67 turned to extend or retract the screw 68 to the desired spaced adjustment of the frame 32 relative to the hitch frame 17. The lock nut 72 may again be tightened to insure a fixed length of the elevation control jack 63. The sleeve 70, at its pivotal connection with the hitch frame 17, is provided with sufficient room between the bifurcated portions 21 to shift in accordance with any angular change of the hitch frame 17 relative to the control frame 32.

While the implement is being drawn by the tractor, it exerts a rearward force below the axis of the trunnions 19 and 20, which are connected to the elevating hitch members 14 and 15, shown in Fig. 1 of the drawings. Thus, the trunnions 19 and 20 act as a fulcrum for the forces, whereby, a forward force is applied to the hitch member 16 in connection with the tractor. These forces apply regardless of the angular adjustment of the pivot bar 28 about the axis of the bolt 34 and regardless of the action of the elevation jack 63 within its floating limits set by the sleeves 65 and 66.

When it is desired to adjust the draft angle of the implement relative to the tractor, the draft control jack 35 may be adjusted, as heretofore described, to limit the angle of the pivot bar 28 with relationship to the frame 32, whereby an adjustment is provided to control the pitch of both disc gangs. Such adjustment provides either more pitch of the front gang and less of the rear gang, or less pitch of the front gang and more of the rear gang. In this manner complete control of the tractor side draft is attained.

It will be seen that the spacer sleeve 43 may engage the projection 31 of the control frame 32 in order to limit movement of the nut 37 of the draft control jack 35, and that the use of the pin 46 may be optional according to certain operational desires of the person employing the implement in connection with a tractor.

When it is desired to transport the multiple gang disc in elevated position above the surface of the ground, the tractor hitch members 14, 15 and 16 are actuated in the conventional manner, which causes the sleeve 70 to engage the sleeve 66 on the elevation jack 63, whereupon the implement is raised.

The spring 50 maintains the implement in certain position thereby preventing it from swinging about the axis of the bolt 34 and permitting the operator, if he so desires, to place the pin 46 in the position as shown in Fig. 3 of the drawings for locking the pivot bar relative to the frame 32. During such operations the stability of the implement, provided by tension of the spring 50, prevents accidents which may be caused by gravitational swinging of the implement about the axis of the bolt 34.

Having thus described the invention and the present embodiments thereof, it is desired to emphasize the fact that many further modifications may be resorted to in a manner limited only by a just interpretation of the following claim.

I claim:

In an agricultural implement for tractors, a hitch frame having three pivotal connections for tractor operated elevating members, a pivot bar having a substantially horizontal pivotal connection with said hitch frame below the lowermost of said first-mentioned pivotal connections, a control frame having a substantially vertical pivotal connection with said pivot bar, a multiple gang disc connected with said control frame, one disc gang adapted to be disposed in axially angular relation with another disc gang, means for fixing the angular disposition of the disc gang axes, an adjustable elevation control jack means interconnecting said control frame and the upper portion of said hitch frame, and adjustable jack means interconnecting said control frame and said pivot bar for adjusting the draft angle thereof about said vertical, pivotal connection whereby the desired axial pitch of the disc gangs rearwardly of a tractor may be attained, said elevation control jack having spaced stop means and a sleeve slidable on said last mentioned jack between said spaced stop means in connection with said hitch frame whereby certain limited floating action of said control frame relative to said hitch is permitted.

References Cited in the file of this patent

UNITED STATES PATENTS

| | | |
|---|---|---|
| Re. 22,627 | McKay | Apr. 3, 1945 |
| 2,247,534 | Von Schlegell | July 1, 1941 |
| 2,320,624 | Love | June 1, 1943 |
| 2,322,342 | Bunn | June 22, 1943 |
| 2,341,807 | Olmstead et al. | Feb. 15, 1944 |
| 2,440,550 | Martin | Apr. 27, 1948 |
| 2,561,032 | Onfrey | July 17, 1951 |
| 2,583,897 | Smeds | Jan. 29, 1952 |
| 2,622,349 | Kinnan | Dec. 23, 1952 |